Aug. 8, 1944.    E. R. GOLDFIELD ET AL    2,355,066
MOBILE UNIT WITH FOREIGN BODY LOCALIZER
Filed April 2, 1941    7 Sheets-Sheet 4

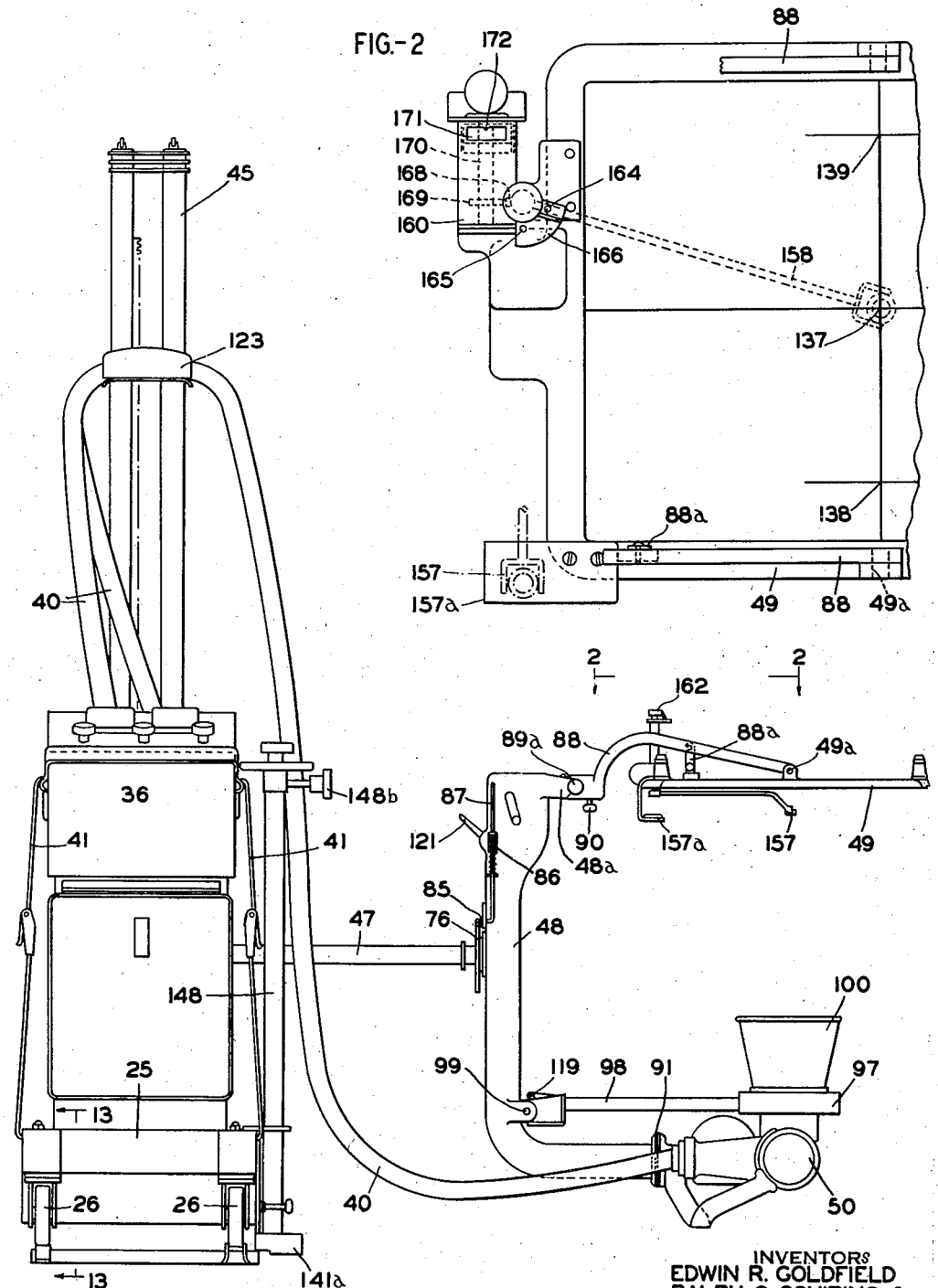

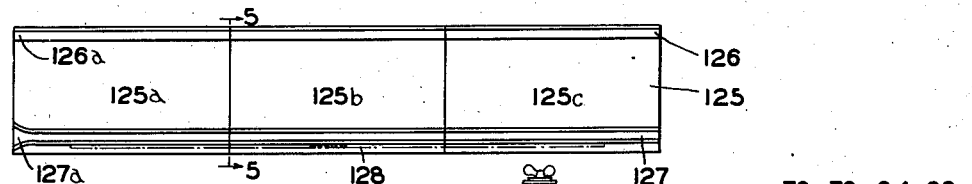
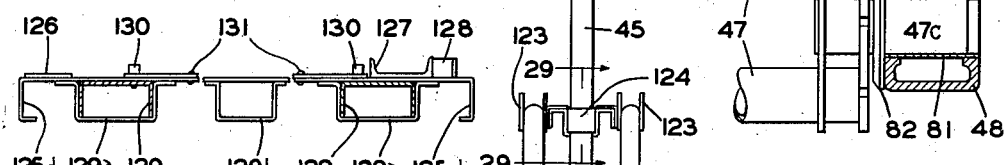
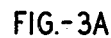
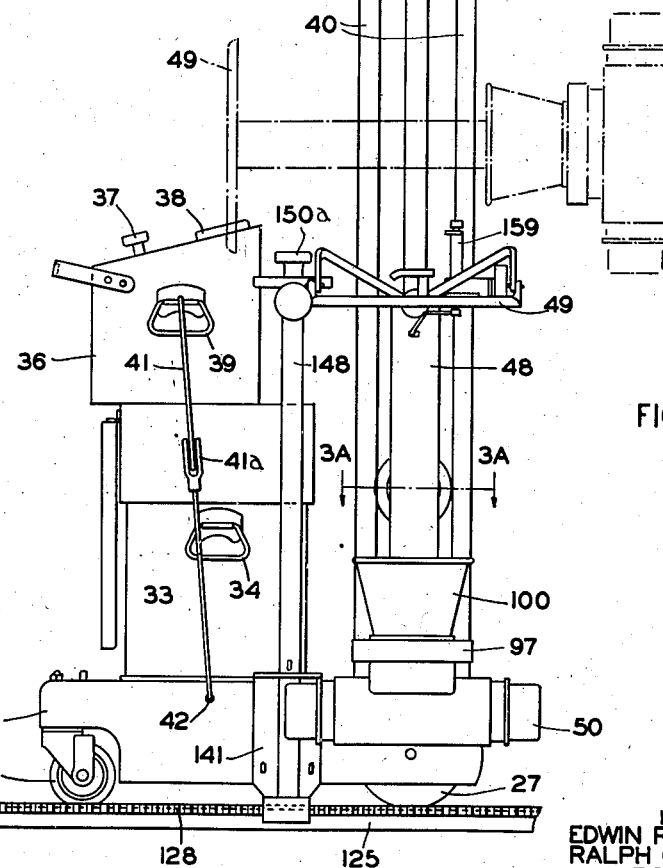

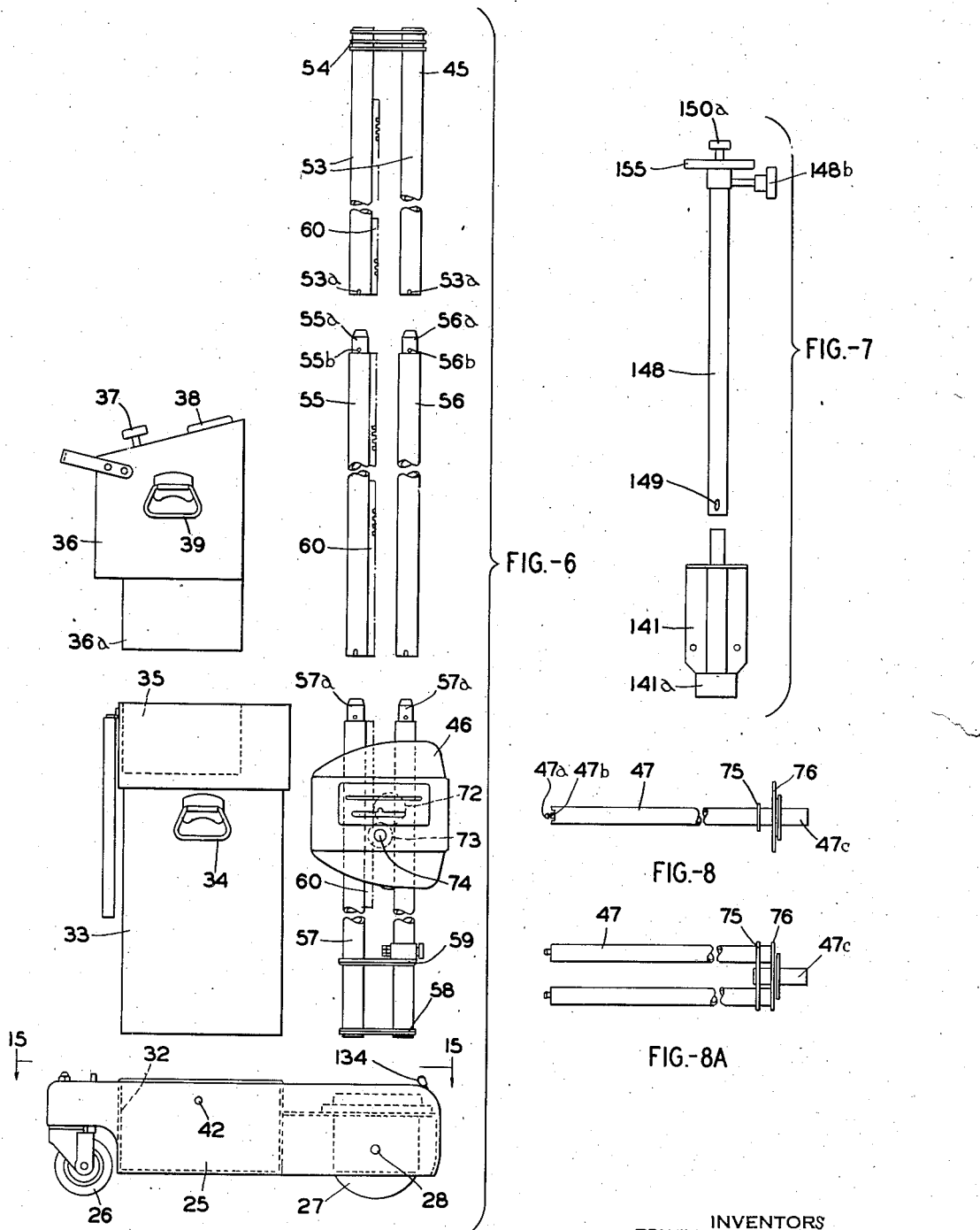

INVENTORS
EDWIN R. GOLDFIELD
RALPH C. SCHIRING &
BY ROBERT J. STAVA
Hyde and Mayer
ATTORNEYS

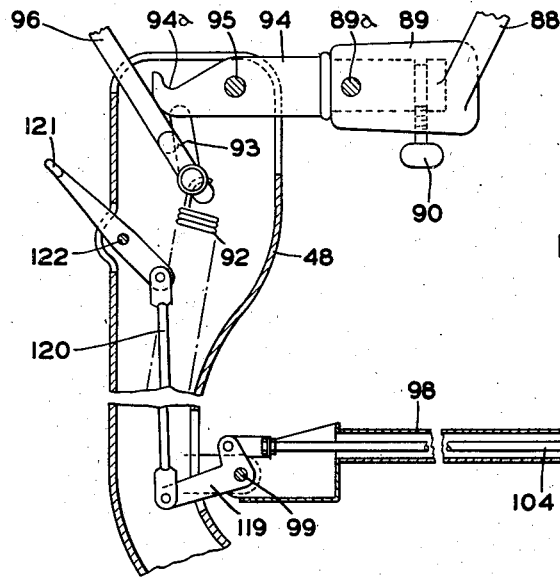
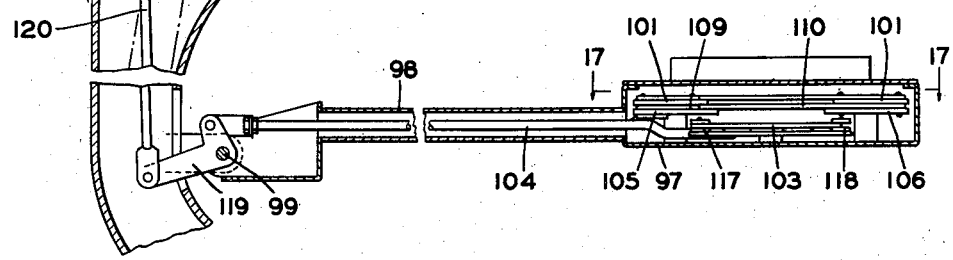
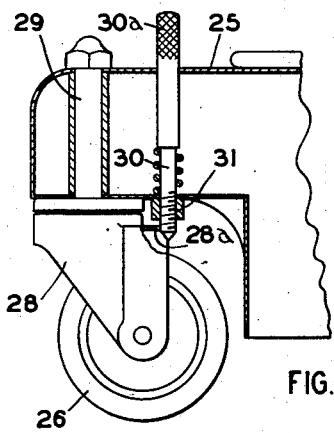
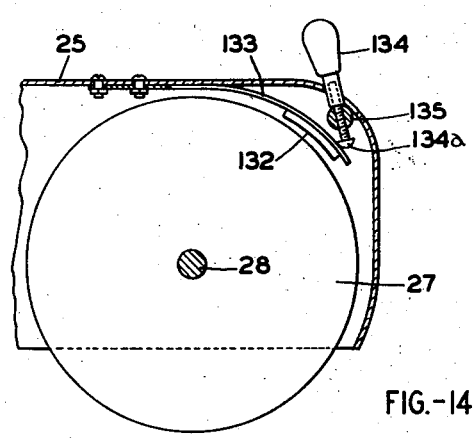
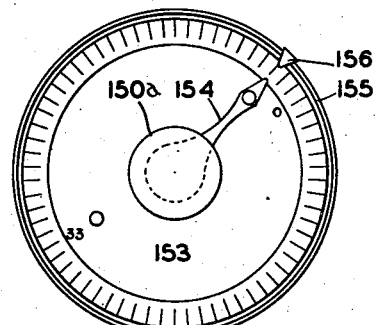

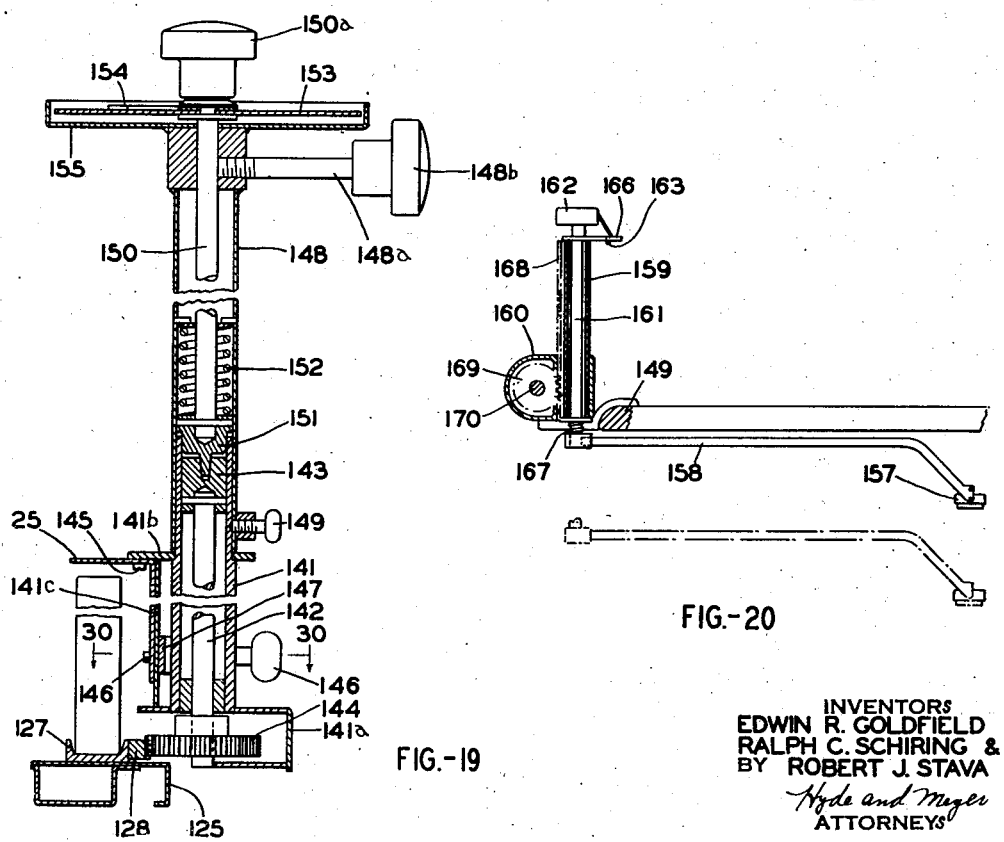

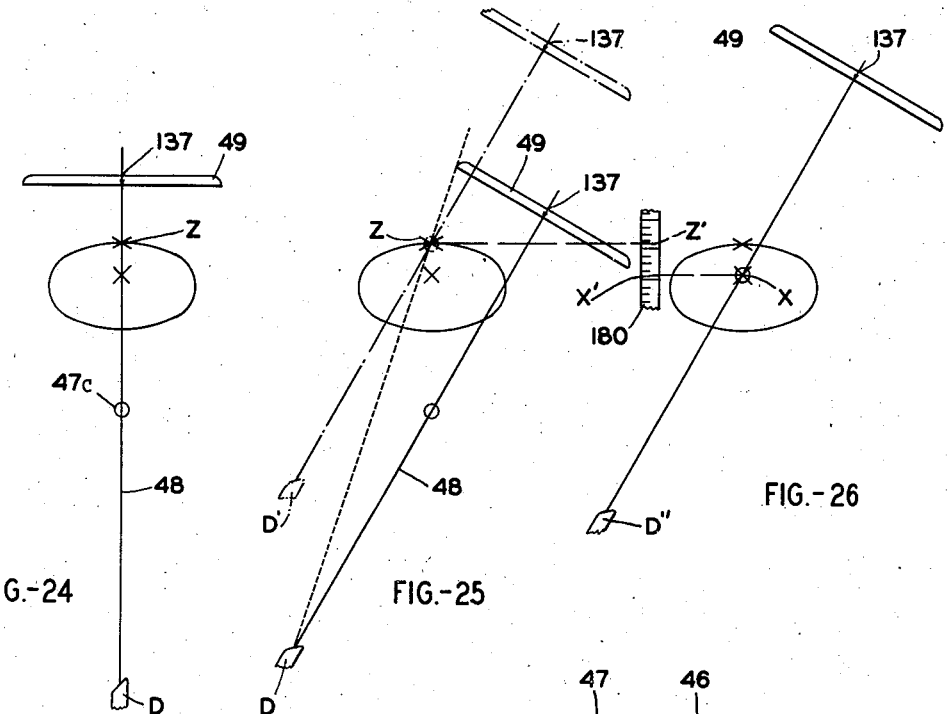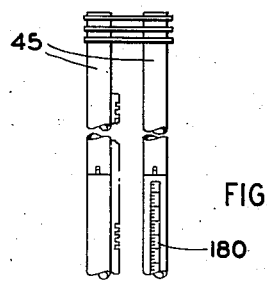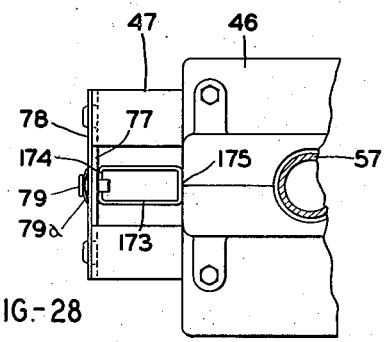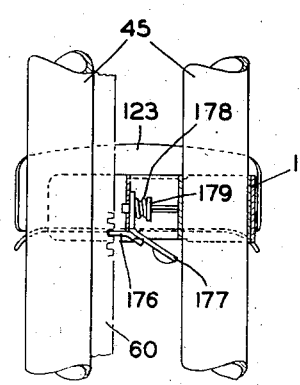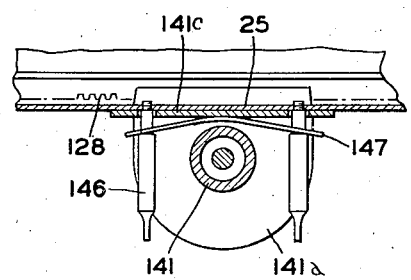

Patented Aug. 8, 1944

2,355,066

UNITED STATES PATENT OFFICE 2,355,066

MOBILE UNIT WITH FOREIGN BODY LOCALIZER

Edwin R. Goldfield, University Heights, Ralph C. Schiring, Cleveland, and Robert J. Stava, East Cleveland, Ohio, assignors to Picker X-Ray Corporation, Waite Manufacturing Division, Inc., Cleveland, Ohio, a corporation of Ohio Application April 2, 1941, Serial No. 386,399

8 Claims. (Cl. 250—59)

This invention relates to improvements in X-ray apparatus and particularly to improvements in a mobile unit adapted to be moved about on a supporting surface and useful for both horizontal and vertical fluoroscopy and for horizontal radiography. Our invention also contemplates the incorporation in this unit, if desired, of equipment for localizing foreign bodies that is to say, for determining the position of a foreign body in a patient.

Our invention also contemplates the construction and arrangement of the parts of the mobile unit and the construction whereby the different parts may be disassembled and packed into a small space so that the device is capable of use as a field unit by the army with a maximum of usefulness and requiring the minimum of space.

Other objects and advantages of the present invention will appear from the accompanying description and drawings and the essential features will be set forth in the claims.

In the drawings,

Fig. 1 is an end elevation of our improved apparatus;

Fig. 2 is an enlarged fragmental top plan view of a portion of the fluoroscopic screen taken in substantially the position of the line 2—2 of Fig. 1;

Fig. 3 is a side elevational view of the apparatus of Fig. 1;

Fig. 3A is an enlarged fragmental sectional view taken along the line 3A—3A of Fig. 3;

Fig. 4 is a top plan view of a base floor or track along which the apparatus may be moved;

Fig. 5 is an enlarged transverse sectional view taken along the line 5—5 of Fig. 4;

Fig. 6 is an exploded view of the apparatus of Fig. 3;

Fig. 7 is an exploded view of a portion of the foreign body localizer attachment of Figs. 1 and 3;

Fig. 8 is a view of a cross arm in a position disassembled from its associated parts of Fig. 6;

Fig. 8A is a top plan view of the cross arm of Fig. 8;

Fig. 13 is an enlarged fragmental sectional view taken along the line 13—13 of Fig. 1;

Fig. 14 is an enlarged fragmental sectional view taken along the line 14—14 of Fig. 15;

Fig. 16 is a fragmental vertical sectional view through the tube and screen supporting bracket of Fig. 1;

Fig. 17 is a sectional view taken along the line 17—17 of Fig. 16;

Fig. 18 is an enlarged top plan view of the dial at the upper end of Fig. 7;

Fig. 19 is a centrally located vertical sectional view through a portion of the foreign body localizer attachment shown at the right of the carriage in Fig. 1 and shown in elevational view in Fig. 7;

Fig. 20 is a sectional view through the skin locator pad which is shown in plan in Fig. 2 and in elevation in Fig. 1;

Figs. 21, 22 and 23 are diagrammatic views illustrating the use of the foreign body localizer;

Figs. 24, 25 and 26 are diagrammatic views illustrating another manner of using our equipment as a foreign body localizer;

Fig. 27 is a view of a portion of the vertical mast illustrating the positioning of a scale for use as described in connection with Figs. 25 and 26;

Figure 10:
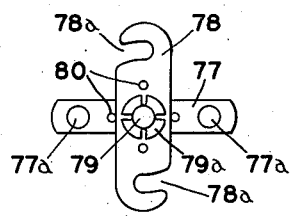
Fig. 10 is a view of an end plate associated with the cross arm of Figs. 8 and 8A.

Fig. 28 is a view showing a stop member limiting lateral movement of the cross arm 47 and is a fragmental top plan view looking downwardly upon the left end of the cross arm 47 as shown in Fig. 8A when the arm is assembled in the carriage 46 with the end plate of Fig. 10 in assembled position;

Fig. 29 is a sectional view taken along the line 29—29 of Fig. 3; and

Fig. 30 is a sectional view taken along the line 30—30 of Fig. 19.

The mobile unit here disclosed may be provided with the track of Figs. 4 and 5 where the unit is to be used in the field where a separate floor or track must be provided. It is useful however without such extra track, in which case the unit may be moved about on the floor of a hospital or other room and such use of the unit is contemplated. The unit therefore is mounted upon a base carriage 25 which as shown in the various views is built up of sheet metal parts preferably welded together to give a generally rectangular carriage supported at one end by the two swiveling casters 26 and at the other end by the two wheels 27 which are supported upon axles 28 suitably mounted in the carriage 25. Preferably all of the wheels have rubber tires. The caster wheels 26 as best seen in Fig. 13 are mounted on forks 28 which are carried by suitable studs 29 in the carriage 25. The wheels are on ball bearings and the casters preferably also have ball bearing mountings. Preferably means is provided for fixing the casters in position so that the wheels 26 are parallel to the wheels 27 to insure movement of carriage 25 in a straight line when that is desired. To this end each fork 28 is provided with a notch 28a into which a bolt 30 may be inserted when desired to fix the casters against turning. This bolt 30 has threaded engagement at 31 with a portion of the carriage 25 and extends above the top of the carriage where the bolt has a knurled end 30a for its manipulation.

Figure 15:
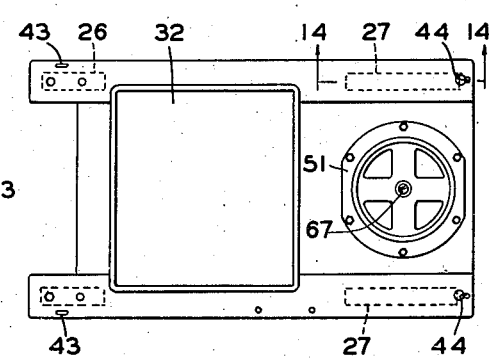
Fig. 15 is a top plan view of the base carriage taken approximately from the position of the line 15—15 of Fig. 6.

The carriage is provided with a square well 32 into which fits the bottom of a transformer case 33. This case houses the usual high tension transformer adapted to receive current at sixty cycles and low voltage from any field generator equipment when used under army field conditions or from any other suitable source when used under hospital conditions. The transformer of course will step up the current to the high voltage requirements for X-ray work. The transformer casing is preferably provided with a handle 34 on each side so that it may be more easily lifted. In the upper portion of the transformer casing is a recess 35 adapted to receive the lower end 36a of the control box 36. This box houses any usual standard control circuits for X-ray equipment including control knobs 37 and meters 38 so that the equipment may be set for the proper operating conditions as is well understood in this art. The control box is preferably provided with a handle 39 on each side for its manipulation. Suitable connections (not shown) are provided at the rear bottom portion, that is to say, the right-hand side of the control box as viewed in Fig. 6, for the attachment of the supply wires from the generator set or other source of current and for the attachment of a hand timer if desired, a foot control switch and other auxiliary equipment. Also a connection (not shown) is provided between the control circuits in box 36 and the transformer in the casing 33. All connections of separable wire connections differ in size, shape or arrangement so that proper connections are always assured. Shockproof cables 40 are connected between the upper rear portion of the transformer in casing 33 and the X-ray tube to be later described. The disassembled position of the base carriage, the transformer casing and the control box is shown in Fig. 6 and the assembled position of these parts is shown in Figs. 1 and 3. As best viewed in Figs. 1 and 3, these parts are held in assembled relationship by means of retaining rods 41, one at each side of the unit, attached between the handle 39 at the top and a suitable opening 42 in the base carriage. Each rod has an over-center toggle securing device 41a so as to hold the parts firmly in position. When the unit is disassembled for packing in the field kit each of the rods is fastened to the top of the base carriage, one on each side thereof, between the points 43 and 44 shown in Fig. 15.

Figure 9:
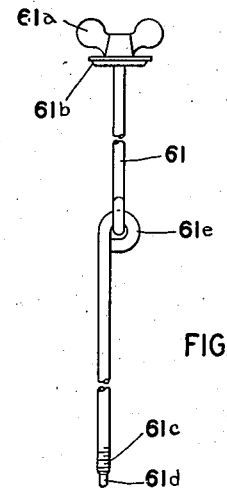
Fig. 9 is a view of the folding draw bolts which secure the vertical mast sections together.

A vertical mast 45 is provided at one end of the base carriage upon which is mounted a vertically movable arm supporting carriage 46. This carriage 46 in turn supports the horizontal cross arm 47 upon the end of which is mounted a C-bracket 48 which carries the fluoroscopic screen 49 and the X-ray tube 50. The mast 45 is mounted for rotation in a well casting 51 (Figs. 11 and 15) which is secured by bolts 52 to the base carriage 25. For purposes of disassembling and packing the mast, it is built in a plurality of separable tubular sections. The upper section comprises a pair of parallel tubes 53 tied together at the top by tie bars 54. The middle section is composed of the separate tubular members 55 and 56 and the bottom section is composed of parallel tubular members 57 tied together at the lower end by tie bars 58 and intermediate the ends mounted in a bearing disk 59. The left-hand tubes 53, 55 and 57 of Fig. 6 have secured rigidly to one side thereof rack members 60 which coact with mechanism in the cross arm supporting carriage 46 for the raising and lowering of that carriage. These rack members are very carefully located on their respective tubes so that when the mast is assembled the rack members are in accurate alinement. The separable connections between the various tubular members of the mast comprise sleeve projections 55a and 56a accurately finished with very small tolerances to fit in the respective coacting lower ends of the tubular members 53. Positioning means comprises the small pins 55b and 56b, respectively, which enter into notches 53a when the parts are assembled. In a similar fashion the sleeve projections 57a on the lower mast section fit into the lower ends of the tubes 55 and 56. The mast is held together as a whole by means of folding draw bolts 61 best illustrated in Fig. 9. Each of these bolts carries a wing nut 61a at the upper end and a centering washer 61b. The lower section of the bolt is threaded as at 61c and carries a guide extension 61d. It will be noted from Fig. 11 that each of the tubular members 57 is provided with a centrally located threaded portion 62 located in a cup-shape depression below the sleeve projection 57a. When the bolt 61 is extended downwardly through the hollow tubular mast sections the cup-shape recess guides the end 61d of the bolt into the threaded opening 62, after which turning of the nut 61a causes the thread 61c to engage the threads at 62 so as to tightly draw the mast sections together. Each bolt 61 is provided with a foldable joint as at 61e so that the bolts may be packed in the field kit. The length of the upper, central and lower sections of the mast when disassembled as shown in Fig. 6 are of approximately the same length as the longer dimension of the base carriage 25 so that these parts will all fit in the same chest.

Figure 11:
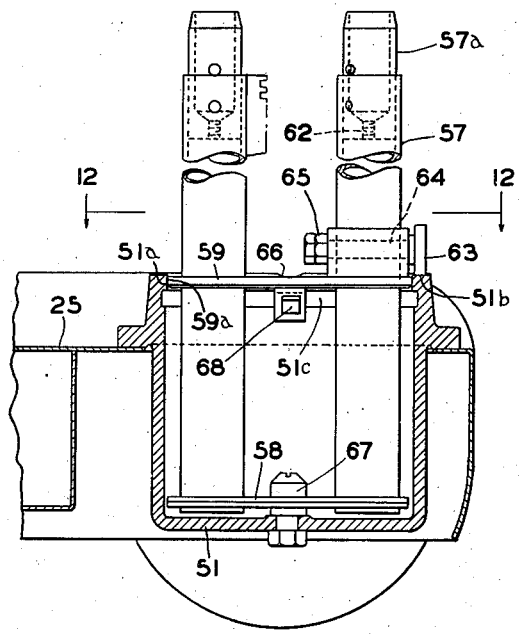
Fig. 11 is an enlarged vertical sectional view through the lower section of the vertical mast.
Figure 12:
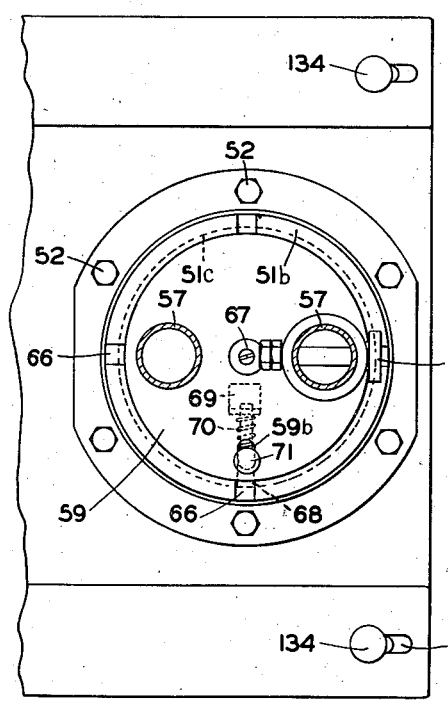
Fig. 12 is a transverse sectional view taken along the line 12—12 of Fig. 11.

The details of the mounting of the mast 45 in the base casting 51 are best seen in Figs. 11 and 12. This base casting has an annular perpendicular bearing surface at 51a adapted to coact with the corresponding annular surface 59a of the disk 59. One of the tubular sections 57 carries a bearing roller 63 on a shaft 64 which extends through the tube and is secured by a nut 65. The roller 63 is so positioned that it bears upon the upper horizontal annular face 51b of the casting 51. Preferably this casting has slightly milled out hollow spots 66 located at four points 90° apart so that the mast may be more or less definitely located in each of four oriented positions with the cross arm 47 extending either forward or rearward parallel to the longer dimension of the base carriage 25 or in position extending laterally to either side of the carriage 25. It will be noted that the roller 63 is on that side of the mast beyond which the arm 47 extends to support the weight of the bracket 48, the screen 49 and the tube 50. This considerable weight at one side of the carriage would not be firmly supported in the absence of the roller 63 and it would be difficult to rotate the mast and its supporting weight without the bearing roller. To steady the mast for true rotative movement, the bottom tie bars 58 are provided with a centrally located opening into which enters a stud 67 which as shown in Fig. 11 is bolted to the central bottom portion of the casting 51. The positions of the bearing surfaces on the disk 59 are accurately located with reference to the stud 67 and all of the coacting bearing surfaces including the central aperture in the bars 58 are held to very small tolerances so that the mast is very firmly supported in erected position.

For holding the mast in assembled position within the base casting 51, a latch 68 is slidably supported beneath the disk 59 in a bracket 69. A spring 70 urges the latch radially outwardly. Through a slot 59b in the disk 59 extends a pin or handle 71 by which the latch may be manipulated. The nose of the latch is adapted to enter into an annular groove 51c in the inner wall of the casting 51 near the top thereof when the mast is assembled in the base.

Means is provided for moving the cross arm supporting carriage 46 vertically along the mast 45 and for holding this carriage in any position to which it is moved. This means comprises a gear 72 indicated in Fig. 6 which engages the rack member 60 and which in turn is operated by a pinion 73 which in turn is operated by a removable crank which may be inserted from either side of carriage 46 at point 74. In connection with the gear mechanism 72, 73 we provide the clutch mechanism disclosed and claimed in Patent No. 2,123,528 granted July 12, 1938, to Edwin R. Goldfield and Caperton B. Horsley. As clearly described in the said patent the crank handle may be rotated freely to move the carriage 46 up and down but when manipulation of the crank handle ceases the built in clutch mechanism automatically locks the carriage in the position to which it has been moved.

The horizontal cross arm 47 comprises a pair of parallel tubular members rigidly connected together at one end by the tie bar 75 and the disk 76. This cross arm is supported on suitable rollers in the carriage 46 so that the arm is freely slidable in a horizontal direction. The cross arm 47 when disassembled as shown in Figs. 8 and 8A is of approximately the same length as the longer dimension of carriage 25 or the various sections of the mast so as to fit in the same chest with those parts. The ends of the tubular portions of the cross arm 47 opposite the tie bar 75 are normally rigidly connected together by means of an end plate assembly best seen in Fig. 10. This comprises two bars 77 and 78 pivotally connected together at 79. In the bar 77 are two openings 77a adapted to pass over the button projections 47a on the ends of the tubular members of the cross arm 47. The arms 78 have slotted openings 78a adapted to swing into position embracing the neck portions 47b which support the buttons 47a so as to secure the end plate assembly on the two tubular members of the cross arm 47. Extruded spots 80 on the arms 77 and 78 interengage with snap action to hold the end plate assembly in assembled position until the same is forcibly removed. It will be understood that with the end plate assembly removed the cross arm 47 is readily inserted through the carriage 46 after which the end plate assembly is secured in position to not only hold the connected ends of the cross arm 47 rigid but also to limit transverse movement of the cross arm 47.

If desired, stop means may be provided for preventing extreme movement of cross arm 47 toward the right as viewed in Fig. 1. Obviously in this position of the parts the bracket 48 with the screen 49 and tube 50 provide a heavy load far out to one side of the carriage 25 and it is undesirable to extend the parts in this manner unless absolutely necessary. To guard against such extreme positioning of the parts, except where absolutely necessary, the stop member 173 of Fig. 28 may be provided. In the form here shown this stop member comprises a closed wire loop passing through a suitable opening in the shank of the securing stud 79. The flat spring 79a lying between the head of the stud 79 and the plate 78 of the end plate assembly serves the double purpose of holding the parts of the end plate assembly in the desired position while at the same time urging the wire loop 173 toward the left as viewed in Fig. 28. The wire loop is flattened at the side 174 where it rests against plate 77 and it results from this construction that the loop 173 is normally returned by spring pressure to a horizontal position so that it engages against carriage 46 at the point 175 and prevents extreme movement of cross arm 47 toward the right. However if full movement of cross arm 47 toward the right is desired then the wire loop 173 may be bent downwardly or upwardly out of the way. Under these conditions the operator is on guard against possible overbalancing of the carriage 25.

The bracket 48 is removably mounted on the outer end of the cross arm 47 for rotation relative thereto. This construction is best seen in Figs. 1 and 3A. The cross arm 47 has a nose 47c extending beyond the disk 76 which enters a suitable bossed opening in the bracket 48. Preferably the opening is provided with a plain bearing 81 which embraces the nose 47c. Rigidly mounted on the nose and slightly spaced from the disk 76 is a truncated cone disk 82. Mounted on the bracket 48 is a stamping 83 having an arm 83a which is loosely bolted to the bracket. The stamping has a beveled nose 83b which engages behind the cone surface of the disk 82 so as to hold the bracket 48 rotatably on the nose 47c and to act additionally as a friction lock if desired. A wing nut 84 controls the position of the stamping 83. The disk 76 is provided with suitable notches 76a into which a locking dog 85 is adapted to enter. This dog is spring pressed toward engaging position and is mounted in a suitable guide 86 on the bracket 48. The dog is controlled by the handle 87. Preferably the outer face of the disk 76, that is, on the right-hand side as viewed in Fig. 1, is provided with a marking dial graduated in degrees so that the operator can determine the position of the main portion of bracket 48 relative to the horizontal or vertical when adjusting the position of bracket 48 rotatably about the nose 47c.

The mounting of the screen and X-ray tube on the bracket 48 and the mounting of this bracket on the cross arm 47 preferably follows the teaching of Patent No. 2,097,095 granted October 26, 1937, to Edwin R. Goldfield, Caperton B. Horsley and Ralph C. Schiring. Reference may be had to this patent for further description if necessary.

The fluoroscopic screen 49 is provided with a bracket 88 by which the screen is pivotally mounted at 95 on the bracket 48. This connection comprises a sleeve 89 on the bracket 88 which is clamped to a separable nose or projection by means of the wing nut 90 so that the parts may be disassembled at this point. The sleeve 89 may be clamped in position to hold the fluoroscopic screen horizontal when desired by means of a pin 89a which extends through sleeve 89, member 94, and bracket arm 48a of bracket 48, as best seen in Figs. 1 and 16. This is the position of the screen for foreign body localization. A latch 88a pivotally mounted on the frame of screen 49 may be hooked over a pin on bracket 88 to prevent tilting of the screen about pivot 49a.

The X-ray tube 50 is of standard construction and is removably secured at the point 91 to an arm of the bracket 48 by a connection which is in all respects similar to that shown in Fig. 3A and the parts have the same dimensions so that if desired the bracket 48 may be removed from the nose 47c and the X-ray tube 50 may be directly mounted on the nose 47c in rotatable fashion.

When the screen 49 is used for horizontal fluoroscopy as shown in Fig. 1, it is desirable to counterbalance the weight of the screen so that it will remain in the desired position. This counterbalance is shown in Fig. 16 and incorporates the structure more fully disclosed and claimed in Patent No. 2,179,357 granted November 7, 1939, to Robert J. Stava. Briefly the spring 92 is attached to a yoke 93 which is adapted in one position of the parts to engage the hook 94a of a member 94 which is pivotally mounted in the bracket 48 at the point 95. A lever 96 controls the connection and disconnection of the yoke 93 with the hook 94a.

We have shown as incorporated in our apparatus a pair of diaphragm shutters in the housing 97 carried by the arm 98 which is pivotally mounted at 99 on the bracket 48 so that the shutters may be moved approximately 90° in a counterclockwise direction from the position shown in Fig. 1 by rotating the arm 98 about the pivot 99. When it is desired to thus move these shutters out of the way the radiation cone 100 may be removed from the housing 97. The arrangement and control of the shutters is more clearly seen in Figs. 16 and 17. A pair of oppositely movable shutters 101 are controlled by rod 102 and a second pair of shutters 103 are movable at right angles to the shutters 101 by the rod 104. Shutters 101 are controlled by levers 105 and 106 which are pivoted to the housing 97 at the points 107 and 108 respectively. Link 109 (Fig. 16) is pivotally connected between the ends of levers 105 and 106 and a second link 110 connects the opposite ends of levers 105 and 106. Directly above link 109 is a member 109a which is rigidly connected to the left-hand shutter 101, Fig. 17, but free of connection with the right-hand shutter. Directly above link 110 is a member 110a which is rigidly connected to the right-hand shutter 101, Fig. 17, but free of connection to the left-hand member. These members 109a and 110a together with their associated links form upper and lower guides for movement of the shutters. The rod 104 is pivotally connected at 111 with a yoke 112 which is connected with lever 113 which in turn is pivotally mounted in housing 97 at the point 114. At the opposite side of the housing a lever 115 is pivotally mounted in the housing at 116. Links 117 and 118 connect the opposite ends of levers 113 and 115. Guide member 117a, overlying link 117, is rigidly connected to the lower shutter 103, Fig. 17, and free of connection to the upper shutter. Member 118a overlying link 118 is rigidly connected to the upper shutter 103, Fig. 17, and free of connection with the lower shutter. The members 117, 117a, 118 and 118a also serve as guides for the back and forth movement of the shutters. Each of the rods 102 and 104 extend through one of the tubular branches of the arm 98 and each is connected to a bell crank 119 which is connected by a link 120 with one of the levers 121 which in turn are pivotally mounted at 122 in the bracket 48. By manipulation of the two levers 121 the position of the shutters is controlled by the operator. The dot-dash position of the shutters in Fig. 17 represents the closed position and the full line view is the open position.

The high tension cables 40 as previously mentioned are connected between the transformer 33 and the X-ray tube 50. The excess length of these cables is supported in two cable supports 123 mounted on opposite sides of the cable support slide 124 which is movable up and down the mast 45. A spring catch on the slide 124 engages the rack 60 so as to hold the cable supports in any adjusted position. This construction is best seen in Fig. 29 wherein the dog 176 is rigidly secured to an arm 177 which is loosely mounted in the cable support slide 124 so that the dog engages the rack 60. A spring 178 on a pin 179 yieldingly urges the dog into engagement with the rack. The end of arm 177 overlies a portion of carriage 46 so that as the carriage is cranked upwardly the dog 176 is automatically released and the cable support slide 124 moves up the mast 45 in advance of carriage 46.

The base carriage 25 as previously mentioned may be provided with a track 125 (Figs. 4 and 5) when some separate additional surface is necessary to support the carriage or when the unit is used as a foreign body localizer. This track is preferably provided in a plurality of sections, the dimensions of which permit them to be placed in the same sized chest which accommodates the carriage 25, the various sections of the mast and other parts previously described. In other words the longer dimension of each of the sections 125a, 125b and 125c is approximately the same as the longer dimension of the carriage 25 and the width is not any greater than that of the carriage. Along one side of the track sections is secured a flat, plain track surface 126. Along the opposite sides of the sections runs a flange track 127. These tracks may slope downwardly toward the floor at the points 126a and 127a so as to facilitate the movement of the carriage 25 on and off the track. It will be understood that the track sections are secured to their respective floor sections and are broken at approximately the same points although the breaks in the track proper and the supporting base may be slightly overlapped if desired. Along the outside of track 127 are secured sections of a rack 128 which is adapted to coact with the foreign body localizer in a manner later described. Preferably as shown in Fig. 5, the base track sections 125 have turned down flanged edges as at 125d so that the general shape of the base track sections is of channel form providing space underneath. In this space are slidably mounted channel-shape connecting members 129 which are slidably retained beneath one or the other of the sections 125a, b, c, when the parts are packed in the field kit, but which may be pulled out to extend in connecting position, one set between the sections 125a and 125b and the other set between the sections 125b and 125c. These slidable connectors are held in position by spring pressed pins 130, the spring arms of which are riveted to the base track sections at the points 131. The supports for connecting members 129 comprise upwardly facing channel members 129a secured to the under surface of the track sections and embracing the members 129. Preferably another upwardly facing channel member 129b is secured along the center of each track section so that the edge flanges 125d and the channel members 129a and 129b present a fairly large surface to mud or soft ground upon which the equipment may rest in the field. Obviously also the members 129a protect the connecting members 129 from dirt and the like.

It is believed that the operation of the apparatus shown thus far will be readily understood. With the apparatus completely assembled, a foot control switch (not shown) may be connected into suitable plugs in the control box 36 and a hand timer may be connected there also if desired. With main line current then connected to the generator as previously mentioned, the equipment is ready for use. With the parts in the full line position of Figs. 1 and 3, the device may be used for horizontal fluoroscopy. With the bracket 48 rotated 90° from the full line position of Fig. 3 and raised by means of carriage 46 to the dot-dash position of Fig. 3, the equipment may be used for vertical fluoroscopy. In this position of the parts it will be noted that the screen 49 is directly in front of an operator standing alongside of the control box 36 with the control knobs 37 and the meters 38 directly at the left-hand of the operator so that he may readily control the equipment with his left hand while manipulating the screen and other equipment with his right hand. With the parts in the position of Fig. 1 it will be noted that the lower offset arm of bracket 48 extends sufficiently below the cross arm 47 that the tube 50 may be lowered practically to the floor or other supporting surface upon which the carriage 25 rides. When the apparatus is to be used for horizontal radiography the carriage 46 is run up the mast 45, the bracket 48 is rotated 180° from the position shown in Fig. 1 and the screen 49 is either removed or turned about the pivot 95 until it is out of the way. With this position of the parts the tube 50 may be placed high above the patient because the offset of bracket 48 relative to arm 47 gives this additional height above the top of the mast 45. If it is desired to traverse the equipment lengthwise of the body of a patient the casters 26 may be locked by the bolts 30 and the equipment may be moved in a line parallel to the length of the patient's body. At the same time the transverse movement made possible by the cross arm 47 permits traversing of the equipment in a direction at right angles to the patient's body.

If it is desired to lock the carriage 25 in any special position, the brake indicated in Fig. 14 may be provided for this purpose. This brake comprises a shoe 132 carried on a spring arm 133 adjacent one of the wheels 27 and preferably the equipment is duplicated on the two sides of the carriage. An arm 134 passes through a slotted opening in a rotatable shaft 135. This arm carries a nose 134a adapted to engage the spring arm 133 so that when the arm 134 is rotated clockwise from the position shown in Fig. 14, the nose 134a will engage and hold the shoe 132 against the wheel.

A number of the parts which have just been described may be packed in a chest having inside dimensions of 16¼" width, 28" length and 14½" height. At the bottom of the chest may be packed the top mast section, the two center mast sections or tubular members and the folding draw bolts. In a layer just above this may be packed the carriage 25 and on the top layer of the chest may be packed the bottom mast section with the cross arm supporting carriage in position thereon, together with the cross arm itself, the cable supports and the radiation cone. In setting up this portion of the apparatus the lower section of the mast is easily assembled into its supporting casting after which the center and top mast sections are assembled and clamped together by means of the folding draw bolts 61. The assembly of the cross arm in the carriage 46 has already been described.

Another chest of the same size above mentioned may have the X-ray tube packed therein, together with the high tension shockproof cables, a tube motor cable and other small accessories.

The control box may be packed in a chest of the same size along with a main line cable for connecting the control box with the generator as previously mentioned, together with a foot switch and timer if desired, a lamp for the foreign body localizer, spare parts and other small accessory equipment.

In a fourth chest may be packed the fluoroscopic screen and the bracket 48 and the detachable parts of the foreign body localizer to be later described. Also the three track sections of Fig. 4 have approximately the same overall dimensions as the carriage 25 so that they may be placed in the same size chest as the other parts.

The foreign body localizer utilizes a method diagrammatically illustrated in Figs. 21 to 23. The body of a patient has been indicated in outline at 136 in each of the diagrams. The fluoroscopic screen 49 is provided with a central cross hair at 137 and side cross hairs at 138 and 139. In the present instance the distance between the side cross hairs is 22 cm. The distance from the screen to the tube target 140 is 66 cm. Assuming that the foreign body is located at the point X, the carriage 25 is moved until the image of the foreign body is located at the central cross hairs 137 when the target is at the point B. The distance Y from the fluoroscopic screen to the skin of the patient directly above the foreign body may then be measured by use of a skin locator pad best seen in Figs. 2 and 20 to be later described. The carriage 25 is then moved until the image of the foreign body appears at one of the side cross hairs as at 139, Fig. 22, when the target is at position A. A position is then noted on a measuring dial shown in Fig. 18 and the carriage 25 is then moved until the foreign body image reaches the other side cross hair at 138, Fig. 23, when the target is at the position C. The movement of the target is proportional to the distance of the foreign body from the target and by proper calibration of the dial of Fig. 18 this depth may be directly read because the distance between the cross hairs 138 and 139 is known. Obviously if the foreign body was substantially at the target it would take 22 cm. of horizontal target movement to change the position of the foreign body image from one side cross hair to the other. In other words it would require 22 cm. of horizontal movement to indicate a position of the foreign body 66 cm. from the fluoroscopic screen. The dial of Fig. 18 is calibrated in this manner into sixty-six divisions and preferably from 0 to 33 around each half of the dial for a purpose to be later described. In this way the horizontal movement of the carriage necessary to transfer the foreign body image from one side cross hair to the other is directly read upon the dial as measuring the distance from the fluoroscopic screen to the foreign body X. Obviously the selection of the dimensions of 22 cm. and 66 cm. are matters of choice and the dial of Fig. 18 may be calibrated to suit any dimensions selected. The principle of proportional movement is the same in any case.

Mechanism for moving the carriage 25 during the location of a foreign body and means for measuring such horizontal movement is shown most clearly in Figs. 7, 18 and 19. A removable bottom section 141 houses a lower shaft member 142 in suitable bearings, this shaft carrying at its upper end a simple clutch member 143. Pinned to the lower end of this shaft member is a gear 144 in position to mesh with the rack 128 on the track base. An extension 141a on the bottom section housing encases the gear 144. This bottom section is secured to the carriage 25 when the parts are assembled by means of a flange 141b which carries a pair of spaced pins 145 adapted to enter suitable openings in the top of carriage 25. A pair of thumbscrews 146, one on each side of the section 141, are threaded into the side sheet member of the carriage 25. A leaf spring 147 engages a shoulder on each screw 146 and the central portion of this leaf spring bears against the vertical plate 141c which forms a portion of the bottom section 141. It results from this construction that the gear 144 is firmly but yieldably held in engagement with the rack 128 when the parts are assembled. An upper section housing 148 has a telescoping engagement over the section 141 down as far as the flange 141b and the upper and lower sections are held together by the set screw 149. Suitably mounted in bearings in the upper section is an upper shaft portion 150 carrying at its lower end a clutch jaw 151 adapted to engage the clutch jaw 143. A spring 152 yieldably urges the shaft 150 downwardly when the parts are in the assembled relationship of Fig. 19. A set screw 148a manipulated by knob 148b will hold shafts 150 and 142 and gear 144 in fixed position when it is desired to lock the carriage 25 against movement. The knob 150a when turned will turn the two shafts and the gear 144 so as to roll the gear along the rack 128 thus causing movement of carriage 25 relative to the base upon which it rests. A dial 153 and a pointer hand 154 are frictionally held between suitable abutments on the shaft 150 so as to rotate therewith. A shallow protecting cup 155 is fixed to the section housing 148 and carries a fixed pointer 156. In using the foreign body localizer the knob 150a is used to cause the horizontal movement of carriage 25 described in connection with Figs. 21 to 23 and the movement of dial 153 relative to 156 is recorded during this horizontal movement so as to read directly on the dial the vertical distance from the fluoroscopic screen to the foreign body X.

For easily determining the distance Y described in connection with Figs. 21 to 23, we provide a skin locator pad best seen in Figs. 2 and 20. This pad marked 157 is carried on an arm 158 which is manipulated by an assembly which comprises a shell 159 mounted for slidable vertical movement in a housing 160. Centrally located in the shell 159 is a rotatably mounted shaft 161 which carries at its upper end a manipulating knob 162. Attached to the knob is a locator pin 163 adapted to engage in either of the openings 164 or 165 in a plate 166 which is non-rotatable because of its connection with the shell 159. A spring 167 presses downwardly on shaft 161 and locator pin 163 so as to hold the shaft and the rod 158 either in position below the central cross hairs 137 or in the dot-dash position indicated in Fig. 2 where it is out of the way. The vertical movement of shell 159 which carries the pad 157 with it is transmitted by means of rack 168 on the shell to a pinion 169 mounted on shaft 170 in the housing 160. This shaft carries a circumferentially arranged dial 171 which moves past a fixed pointer 172. This dial 171 is graduated to give a computation in the same units as are read on the dial 153, that is to say, in the present instance centimeters are read directly on the dial 171. The centimeters indicated on this dial are the distance necessary to move the locator pad 137 from the fluoroscopic screen level into contact with the skin of the patient at the point Z, Fig. 21, thus directly indicating the distance Y in centimeters. The rack 168 where it passes through housing 160 acts as a key to prevent rotation of the shell 159.

An inking pad 157a may be supported from the frame of screen 49 as best seen in Fig. 1 in such a position that pad 157 when moved to the dot-dash position of Fig. 2 will rest upon the inking pad so that when the skin locator pad is again used it will carry ink on its lower surface and mark the skin of the patient.

Obviously if the distance from the fluoroscopic screen to the foreign body X is indicated on the dial 153 and if the distance Y is measured on dial 171, then the difference between these two figures will give the distance between Z and X or the depth of the foreign body below the skin of the patient. This may be read directly, that is to say, the subtraction may be performed mechanically with the mechanism here disclosed. For instance, the pointer 154, Fig. 18, is set to one side of the zero line of dial 153 by the number of units read on dial 171. The dial 153 is then set with pointer 154 opposite the fixed pointer 156 when the parts are in the position of Fig. 22, that is to say, when the image of the foreign body is at one of the side cross hairs and before the traversing movement takes place. This traversing movement is then accomplished by rotating the knob 150a and this rotation carries the dial 153 in a counterclockwise direction as viewed in Fig. 18. Thus the first portion of dial rotation subtracts the number of units set off by the pointer 154 and the number of units finally read off on the lower right-hand side of the dial at the pointer 156 when the parts reach the position diagrammed in Fig. 23 will read directly the distance from Z to X.

It will be noted with respect to the parts just discussed for use in foreign body localization that localization may be carried out by either clockwise or counterclockwise movement on the dial shown in Fig. 18. In other words one may start with the image on either cross hair 138 or 139 and work to the other cross hair. In practice we prefer to color the two halves of the dial of Fig. 18 different colors with corresponding colors at different sides of the fluoroscopic screen frame 49 so that the operator starts from the same color on the screen and dial.

In horizontal radiography when the tube is supported at the upper end of mast 45 and a photographic plate is positioned beneath the patient, the travel of bracket 48 necessary to move the tube 50 short distances as in taking stereoscopic pictures may be measured in centimeters upon the dial of Fig. 18. In other words, this is a direct measurement of the stereoscopic shift.

Another manner of using our improved equipment for foreign body localization is diagrammatically illustrated in Figs. 24, 25 and 26. Here the localization is carried out by locking the carriage 25 in position and relying solely upon vertical movement of the carriage 46. As in the previously described case, the first step here before locking carriage 25 is to place the bracket 48 represented by a line in Fig. 24 in vertical position with the pivot 47c at the point marked. This places the target of the X-ray tube 50 at the point D and the fluoroscopic screen 49 directly above it. The carriage 25 is manipulated until the image of the foreign body X appears at the central cross hair 137 on the fluoroscopic screen. A marker is then placed at the point Z on the skin of the patient vertically above the foreign body X. This marker may comprise a piece of lead of distinctive shape held on by adhesive plaster. The next step is to tilt the bracket 48 to any convenient angle as shown in full lines in Fig. 25. This angle may be selected so that shadows of bones, etc., do not interfere with the process of localization. The central ray of the X-ray tube moving from the target through the marker Z will throw the image of this marker to one side of the cross hair 137. The carriage 46 is then moved vertically until the target reaches the position D' where the image of the marker Z is again on the cross hair 137 of the screen 49 in the dot-dash position shown in Fig. 25. The position of a pointer on carriage 46 is then noted at the point Z' on a scale 180 which may be mounted in any convenient position. For instance, as shown in Fig. 27 it may be mounted upon one of the tubes of mast 45 in such a manner as to be adjustable if desired so that a zero point may be brought to the position Z' and dimensions thereafter read directly. The next step in localization is to move carriage 46 downwardly carrying the tube target to the position D" as indicated in Fig. 26 where the image of the foreign body X appears at the central cross hair 137 of the screen 49. The position of the same pointer on carriage 46 will then be noted at the point X' on the scale 180 and the difference between these two points X' and Z' is the distance of the foreign body X below the marker Z in the body of the patient. It will be noted that it is immaterial where on the bracket 48 or carriage 46 one takes his reference point for marking on the vertical scale because all of these parts move by an amount equal to the distance Z'—X'. Our improved apparatus therefore may be used in either of two easily understandable manners to determine directly the distance of a foreign body below a point on the skin of the patient examined.

What we claim is:

1. In X-ray apparatus for locating a foreign body, a carriage movable along a surface, a bracket adjustably mounted on said carriage, an X-ray tube and a fluoroscopic screen mounted on said bracket in fixed relation to each other and so that the rays of said tube are directed toward said screen, there being indicia on said screen, and means for indicating the amount of carriage travel necessary to move between said indicia the image on said screen of a foreign body in fixed position between said tube and screen.

2. In X-ray apparatus for locating a foreign body, means mounting an X-ray tube and a fluoroscopic screen in fixed relation to each other so that the rays of said tube are directed toward said screen, spaced indications on said screen a predetermined distance apart, means for moving said mounting means to cause the image on said screen of a foreign body in fixed position between said tube and screen to move from one of said indications to the other, and means for indicating the amount of such movement of said moving means.

3. Apparatus as in claim 2 wherein said indicating means is calibrated to read in terms of measuring units from said screen to a foreign body when said image on said screen is moved from one of said indications to the other.

4. Apparatus as in claim 2 wherein said indicating means is calibrated in two directions from a zero point to read in terms of measuring units from said screen to a foreign body when said image on said screen is moved from one of said indications to the other, together with means for adjustably setting said indicating means before said moving means is actuated to so move said image across said screen, whereby the distance in measuring units from said screen to the skin of a patient may be set off on one side of said zero point after which said moving means may be operated in a direction to cause indication of said image movement on the other side of said zero point, so that the distance from the screen to the skin of the patient is mechanically subtracted on said indicating means.

5. Apparatus as in claim 2 wherein said indicating means is calibrated to read in terms of measuring units from said screen to a foreign body when said image on said screen is moved from one of said indications to the other, a skin locator pad movable in line with said X-rays and at right angles to said screen, and means for indicating the amount of said movement in the same measuring units.

6. In X-ray apparatus, a base carriage, means mounting on said carriage an X-ray tube and a fluoroscopic screen in fixed relation to each other so that the rays of said tube are directed toward said screen, spaced indications on said screen, a track on which said carriage moves, a rack rigidly connected to said track, a gear rotatably journalled in said carriage in position to engage said rack, means for rotating said gear to thereby move said carriage, and means for indicating the amount of rotation of said gear.

7. The combination of claim 6, wherein said indicating means comprises a dial, and a frictional driving connection between said rotating means and said dial.

8. In X-ray apparatus for locating a foreign body in a patient, a fluoroscopic screen adapted to be positioned on one side of the patient and to receive the shadow of the foreign body cast by X-rays passing through the patient, a skin locator pad carried by said screen and movable between said screen and patient, and means for indicating the amount of said movement of the pad relative to the screen.

EDWIN R. GOLDFIELD.
RALPH C. SCHIRING.
ROBERT J. STAVA.